(12) United States Patent
Chen et al.

(10) Patent No.: US 12,238,594 B2
(45) Date of Patent: Feb. 25, 2025

(54) METHOD OF HANDOVER PROCEDURE AND RELATED DEVICE

(71) Applicant: FG Innovation Company Limited, Tuen Mun (HK)

(72) Inventors: Hung-Chen Chen, Taipei (TW); Yung-Lan Tseng, Taipei (TW); Mei-Ju Shih, Taipei (TW); Chie-Ming Chou, Taipei (TW)

(73) Assignee: SHARP KABUSHIKI KAISHA, Sakai (JP)

( * ) Notice: Subject to any disclaimer, the term of this patent is extended or adjusted under 35 U.S.C. 154(b) by 363 days.

(21) Appl. No.: 17/619,724

(22) PCT Filed: Jul. 14, 2020

(86) PCT No.: PCT/CN2020/101881
§ 371 (c)(1),
(2) Date: Dec. 16, 2021

(87) PCT Pub. No.: WO2021/008522
PCT Pub. Date: Jan. 21, 2021

(65) Prior Publication Data
US 2022/0312283 A1    Sep. 29, 2022

Related U.S. Application Data

(60) Provisional application No. 62/874,808, filed on Jul. 16, 2019.

(51) Int. Cl.
*H04W 36/00* (2009.01)
*H04W 74/00* (2009.01)
*H04W 36/08* (2009.01)

(52) U.S. Cl.
CPC ... *H04W 36/0061* (2013.01); *H04W 36/0088* (2013.01); *H04W 74/002* (2013.01); *H04W 36/08* (2013.01)

(58) Field of Classification Search
CPC .................................................. H04W 74/008
See application file for complete search history.

(56) References Cited

U.S. PATENT DOCUMENTS

2014/0328325 A1* 11/2014 Bai ..................... H04W 74/008
370/331
2017/0325267 A1* 11/2017 Zhu ..................... H04W 74/006
(Continued)

FOREIGN PATENT DOCUMENTS

| CN | 108271228 A | 7/2018 |
| WO | 2018/113655 A1 | 6/2018 |

OTHER PUBLICATIONS

MediaTek Inc., "Mobility Failure Recovery in NR", R2-1906485, 3GPP TSG-RAN WG2 Meeting #106, Reno, NV, USA, May 13-17, 2019.

(Continued)

*Primary Examiner* — Ricky Q Ngo
*Assistant Examiner* — Kabir U Jahangir
(74) *Attorney, Agent, or Firm* — ScienBiziP, P.C.

(57) ABSTRACT

A method for a user equipment (UE) performing a handover procedure is disclosed. The method includes receiving a handover command from a network, in a case that a first information related to an offset time is included in the handover command, performing the handover procedure based on the handover command after the offset time, and in a case that a second information related to a configured area is included in the handover command, performing the handover procedure based on the handover command when the UE locating within the configured area.

16 Claims, 4 Drawing Sheets

(56) References Cited

U.S. PATENT DOCUMENTS

| | | | | |
|---|---|---|---|---|
| 2019/0037449 | A1* | 1/2019 | Fujishiro | H04W 4/40 |
| 2019/0098539 | A1* | 3/2019 | Zhang | H04W 36/0033 |
| 2019/0387401 | A1* | 12/2019 | Liao | H04W 80/10 |
| 2019/0387438 | A1 | 12/2019 | Chang et al. | |
| 2020/0120560 | A1* | 4/2020 | Sunell | H04W 36/08 |
| 2021/0022198 | A1* | 1/2021 | Wang | H04W 36/1443 |
| 2021/0410039 | A1* | 12/2021 | Da Silva | H04W 36/0079 |
| 2022/0039044 | A1* | 2/2022 | Wu | H04W 36/0055 |
| 2022/0322448 | A1* | 10/2022 | Latheef | H04B 7/063 |

OTHER PUBLICATIONS

3GPP TS 38.331, "3rd Generation Partnership Project; Technical Specification Group Radio Access Network; NR; Radio Resource Control (RRC) protocol specification (Release 15)", V15.6.0 (Jun. 2019).

3GPP TR 38.821, "3rd Generation Partnership Project; Technical Specification Group Radio Access Network; Solutions for NR to support non-terrestrial networks (NTN) (Release 16)", V0.7.0 (May 2019).

3GPP TS 38.213, "3rd Generation Partnership Project; Technical Specification Group Radio Access Network; NR; Physical layer procedures for control (Release 15)", V15.6.0 (Jun. 2019).

\* cited by examiner

METHOD OF HANDOVER PROCEDURE AND RELATED DEVICE

CROSS-REFERENCE TO RELATED APPLICATION(S)

The present disclosure claims the benefit of and priority to U.S. provisional Patent Application Ser. No. 62/874,808 filed on Jul. 16, 2019, entitled "Enhanced Handover Procedure for Non-Terrestrial Networks," (hereinafter referred to as "the '808 provisional"). The disclosure of the '808 provisional is hereby incorporated fully by reference into the present disclosure.

FIELD

The present disclosure generally relates to wireless communications, and more particularly, to a method of handover procedure and a related device.

BACKGROUND

For New Radio (NR) in a non-terrestrial network (NTN), the NTN may refer to a network or segment of networks using radio frequency (RF) resources on a satellite or unmanned aircraft system (UAS) platform. It is noted that the satellite is a space-borne vehicle embarking a bent pipe payload or a regenerative payload telecommunication transmitter, placed into Low-Earth Orbit (LEO), Medium-Earth Orbit (MEO), or Geostationary Earth Orbit (GEO). The UAS are systems encompassing Tethered UAS (TUA), Lighter Than Air UAS (LTA), Heavier Than Air UAS (HTA), all operating in altitudes typically between 8 and 50 km including High Altitude Platforms (HAPs).

Figure 1:
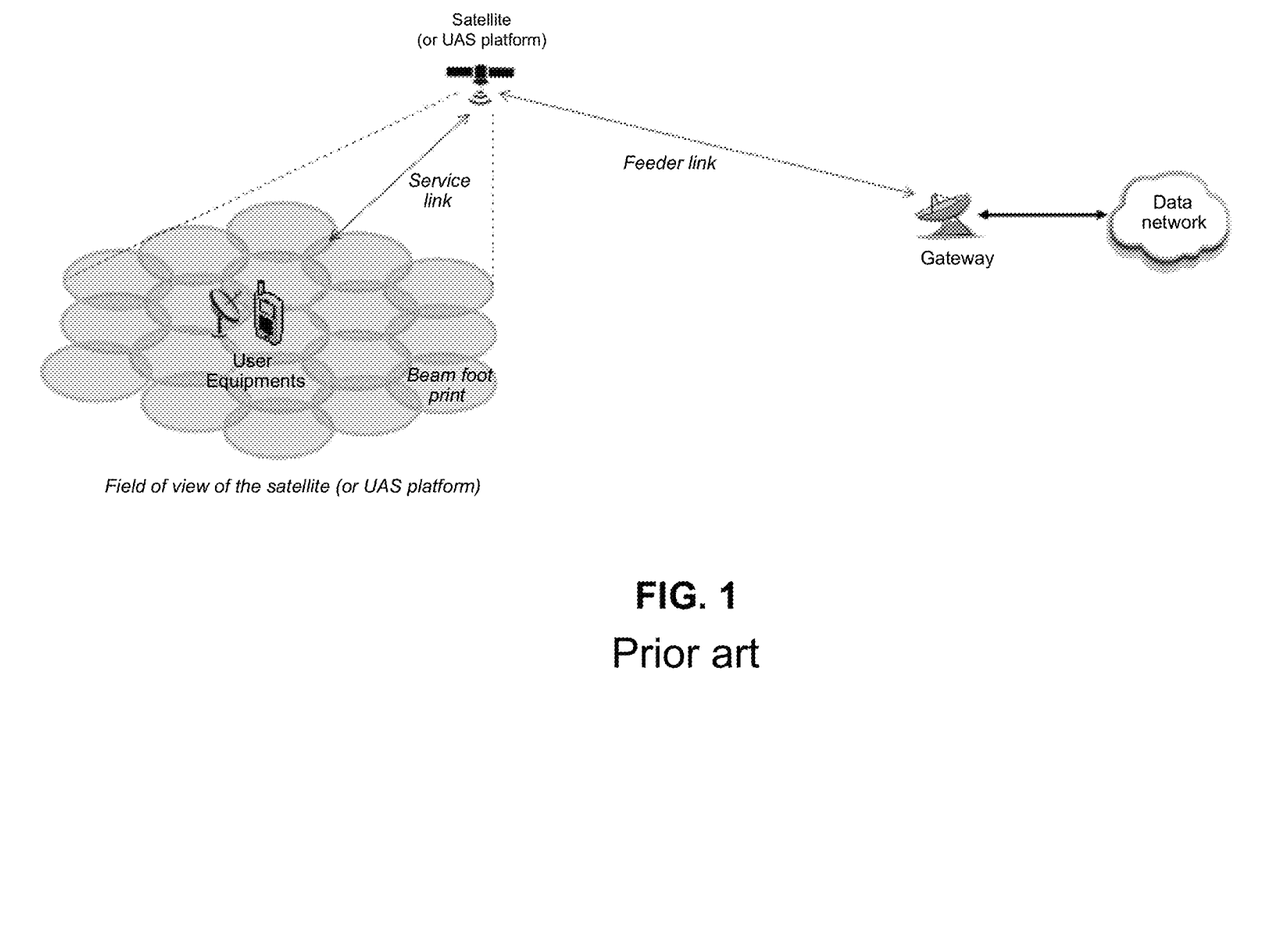
FIG. 1 is a schematic diagram illustrating a non-terrestrial network deployment, in accordance with related art methods.

FIG. 1 is a schematic diagram illustrating a non-terrestrial network deployment, in accordance with related art methods. FIG. 1 illustrates an example scenario based on a transparent payload of the NTN providing access to a user equipment (UE). The satellite (or UAS platform) typically generates several beams over a given service area. The satellite or UAS platform may be implemented by either a transparent or a regenerative payload.

The transparent payload provides the functions of radio frequency filtering, frequency conversion, and amplification on a waveform signal. Thus, the waveform signal repeated by the payload is un-changed. The regenerative payload provides the functions of radio frequency filtering, frequency conversion, and amplification as well as demodulation/decoding, switch and/or routing, coding/modulation on the waveform signal. This is effectively equivalent to have all or part of the base station (e.g., a next-generation node B (gNB)) functions onboard the satellite (or UAS platform).

In NTN, the UE mobility may occur due to the change of the interface. For example, the UE may need to perform a handover (HO) procedure when the satellite moves out of the coverage of the current radio network node on the ground and the UE connects to either a new radio network node on the ground or a new network node onboard the satellite. For different architecture options, the change may mean the change of AMF (Access and Mobility Function) or the change of gNB centralized unit (CU).

Due to the change of interface, all connected UEs need to be handed over to a new network node (e.g., AMF or gNB-CU). For example, for LEO (Low Earth Orbiting) case with gNB on satellite, a group of UEs connected to the source satellite cell may have to be suddenly handed over to a new satellite cell when the serving satellite changes. However, handing over all connected UEs in a short period may cause significant signaling load. In addition, the collision of random access of the HO procedure at the new node (e.g., new target gNB) may occur due to the limited contention-free random access (RA) resources. To reduce RA collision rate for increasing the HO procedure success opportunity, an enhanced HO procedure in NTN is required to reduce signaling overhead, RA collision, and power saving.

SUMMARY

The present disclosure is directed to a method of performing a handover procedure and a related device.

According to a first aspect of the present disclosure, a method for a user equipment (UE) performing a handover procedure is disclosed. The method includes receiving a handover command from a network, in a case that a first information related to an offset time is included in the handover command, performing the handover procedure based on the handover command after the offset time, and in a case that a second information related to a configured area is included in the handover command, performing the handover procedure based on the handover command when the UE locates within the configured area.

An implementation of the first aspect further comprises receiving, from the network, a network command for triggering the handover command, and after receiving the network command, performing the handover command procedure according to at least one of the handover command and the network command.

In another implementation of the first aspect, the offset time is included in the at least one of the handover command and the network command for instructing the UE to perform the handover procedure after the offset time.

In another implementation of the first aspect, a backoff indicator is included in the at least one of the handover command and the network command for instructing the UE to perform a random access resource selection procedure for the handover procedure after a backoff time that is randomly selected by the UE from a backoff time range indicated by the backoff indicator.

In another implementation of the first aspect, the network command includes priority information for performing a random access procedure for the UE during the handover procedure.

In another implementation of the first aspect, the handover command is assigned an identity.

Another implementation of the first aspect further comprises receiving, from the network, a configuration indicating an identity, the handover command comprising a plurality of handover commands, selecting at least one of the plurality of handover commands that are assigned an identity that matches the identity indicated in the configuration, and performing the handover procedure according to the selected at least one handover command.

In another implementation of the first aspect, the handover command comprises a plurality of handover commands, and the network command includes an indication associated with an identity for instructing the UE to apply at least one of the plurality of handover commands that have a same identity for the handover procedure.

Another implementation of the first aspect further comprises performing a random access resource selection procedure according to a priority of the UE, where the priority is determined by the UE according to at least one of a service, an access class, and a mobility status on the UE.

Another implementation of the first aspect further comprises suspending a measurement and corresponding measurement reporting during the offset time.

According to another aspect of the present disclosure, a user equipment (UE) for performing a handover procedure is disclosed. The UE comprises a processor for executing computer-executable instructions, and a non-transitory machine-readable medium, coupled to the processor, for storing the computer-executable instructions, wherein the computer-executable instructions instruct the processor to receiving a handover command from a network, in a case that a first information related to an offset time is included in the handover command, performing the handover procedure based on the handover command after the offset time, and in a case that a second information related to a configured area is included in the handover command, performing the handover procedure based on the handover command when the UE locating within the configured area.

BRIEF DESCRIPTION OF THE DRAWINGS

Aspects of the exemplary disclosure are best understood from the following detailed description when read with the accompanying figures. Various features are not drawn to scale, dimensions of various features may be arbitrarily increased or reduced for clarity of discussion.

DETAILED DESCRIPTION

The following description contains specific information pertaining to exemplary implementations in the present disclosure. The drawings and their accompanying detailed description are directed to exemplary implementations. However, the present disclosure is not limited to these exemplary implementations. Other variations and implementations of the present disclosure will occur to those skilled in the art. Unless noted otherwise, like or corresponding elements in the figures may be indicated by like or corresponding reference numerals. Moreover, the drawings and illustrations are generally not to scale and are not intended to correspond to actual relative dimensions.

For consistency and ease of understanding, like features are identified (although, in some examples, not shown) by numerals in the exemplary figures. However, the features in different implementations may be different in other respects, and therefore shall not be narrowly confined to what is shown in the figures.

The phrases "in one implementation," and "in some implementations," may each refer to one or more of the same or different implementations. The term "coupled" is defined as connected, whether directly or indirectly via intervening components, and is not necessarily limited to physical connections. The term "comprising" means "including, but not necessarily limited to" and specifically indicates open-ended inclusion or membership in the described combination, group, series, and equivalents. The expression "at least one of A, B and C" or "at least one of the following: A, B and C" means "only A, or only B, or only C, or any combination of A, B and C."

Additionally, any two or more of the following paragraphs, (sub)-bullets, points, actions, behaviors, terms, alternatives, examples, or claims described in the following disclosure may be combined logically, reasonably, and properly to form a specific method. Any sentence, paragraph, (sub)-bullet, point, action, behaviors, terms, or claims described in the following disclosure may be implemented independently and separately to form a specific method. Dependency, e.g., "based on", "more specifically", "preferably", "In one embodiment", "In one implementation", "In one alternative" etc., in the following disclosure refers to just one possible example that would not restrict the specific method.

For explanation and non-limitation, specific details, such as functional entities, techniques, protocols, and standards are set forth for providing an understanding of the described technology. In other examples, detailed description of well-known methods, technologies, system, and architectures are omitted so as not to obscure the description with unnecessary details.

Persons skilled in the art will recognize that any described network function(s) or algorithm(s) may be implemented by hardware, software, or a combination of software and hardware. Described functions may correspond to modules that are software, hardware, firmware, or any combination thereof. The software implementation may comprise computer executable instructions stored on computer readable medium such as memory or other type of storage devices. For example, one or more microprocessors or general-purpose computers with communication processing capability may be programmed with corresponding executable instructions and carry out the described network function(s) or algorithm(s). The microprocessors or general-purpose computers may be formed of applications specific integrated circuitry (ASIC), programmable logic arrays, and/or using one or more digital signal processor (DSPs). Although some of the disclosed implementations are directed to software installed and executing on computer hardware, alternative implementations as firmware or as hardware or combination of hardware and software are well within the scope of the present disclosure.

The computer readable medium includes but is not limited to random access memory (RAM), read only memory (ROM), erasable programmable read-only memory (EPROM), electrically erasable programmable read-only memory (EEPROM), flash memory, compact disc (CD) read-only memory (CD-ROM), magnetic cassettes, magnetic tape, magnetic disk storage, or any other equivalent medium capable of storing computer-readable instructions.

A radio communication network architecture (e.g., a long term evolution (LTE) system, an LTE-Advanced (LTE-A) system, an LTE-A Pro system, or a New Radio (NR) system typically includes at least one base station (BS), at least one UE, and one or more optional network elements that provide a connection with a network. The UE communicates with the network (e.g., a core network (CN), an evolved packet core (EPC) network, an Evolved Universal Terrestrial Radio Access Network (RAN) (E-UTRAN), a Next-Generation (GN) Core (NGC), 5G CN (5GC), or an internet via a RAN established by the BS.

It should be noted that, in the present disclosure, a UE may include, but is not limited to, a mobile station, a mobile terminal or device, a user communication radio terminal. For example, a UE may be a portable radio equipment, that includes, but is not limited to, a mobile phone, a tablet, a wearable device, a sensor, or a personal digital assistant (PDA) with wireless communication capability. The UE is configured to receive and transmit signals over an air interface to one or more cells in a RAN.

A BS may include, but is not limited to, a node B (NB) as in the UMTS, an evolved node B (eNB) as in the LTE-A, a radio network controller (RNC) as in the UMTS, a BS controller (BSC) as in the Global System for Mobile communications (GSM)/GSM Enhanced Data rates for GSM Evolution (EDGE) RAN (GERAN), an Next Generation (NG)-eNB as in an Evolved Universal Terrestrial Radio Access (E-UTRA) BS in connection with the 5GC, a next generation node B (gNB) as in the 5G-RAN, and any other apparatus capable of controlling radio communication and managing radio resources within a cell. The BS may connect to serve the one or more UEs via a radio interface to the network.

A BS may be configured to provide communication services according to at least one of the following radio access technologies (RATs): Worldwide Interoperability for Microwave Access (WiMAX), GSM (often referred to as 2G), GERAN, General Packet Radio Service (GRPS), UMTS (often referred to as 3G) according to basic wideband-code division multiple access (W-CDMA), high-speed packet access (HSPA), LTE, LTE-A, evolved LTE (eLTE), New Radio (NR, often referred to as 5G), and/or LTE-A Pro. However, the scope of the present disclosure should not be limited to these protocols. The BS may serve one or more UEs through a radio interface.

The BS is operable to provide radio coverage to a specific geographical area using a plurality of cells forming the RAN. The BS supports the operations of the cells. Each cell is operable to provide services to at least one UE within radio coverage of the cell. More specifically, each cell (often referred to as a serving cell) provides services to serve one or more UEs within the cell's radio coverage, (e.g., each cell schedules the downlink (DL) and optionally uplink (UL) resources to at least one UE within the cell's radio coverage for DL and optionally UL packet transmissions). The BS can communicate with one or more UEs in the radio communication system via the plurality of cells. A cell may allocate sidelink (SL) resources for supporting proximity service (ProSe), LTE SL service, and LTE/NR Vehicle to Everything (V2X) services. Each cell may have overlapped coverage areas with other cells.

As discussed above, the frame structure for NR is to support flexible configurations for accommodating various next generation (e.g., 5G) communication requirements, such as Enhanced Mobile Broadband (eMBB), Massive Machine Type Communication (mMTC), Ultra-Reliable and Low-Latency Communication (URLLC), while fulfilling high reliability, high data rate and low latency requirements. The Orthogonal Frequency-Division Multiplexing (OFDM) technology as agreed in the 3rd Generation Partnership Project (3GPP) may serve as a baseline for NR waveform. The scalable OFDM numerology, such as the adaptive sub-carrier spacing, the channel bandwidth, and the Cyclic Prefix (CP) may also be used. Additionally, two coding schemes are considered for NR, specifically Low-Density Parity-Check (LDPC) code and Polar Code. The coding scheme adaption may be configured based on the channel conditions and/or the service applications.

Moreover, it is also considered that in a transmission time interval of a single NR frame, a Downlink (DL) transmission data, a guard period, and an Uplink (UL) transmission data should at least be included, where the respective portions of the DL transmission data, the guard period, the UL transmission data should also be configurable, for example, based on the network dynamics of NR. In addition, SL resources may also be provided in an NR frame to support ProSe services or V2X services.

In addition, the terms "system" and "network" herein may be used interchangeably. The term "and/or" herein is only an association relationship for describing associated objects, and represents that three relationships may exist. For example, A and/or B may indicate that: A exists alone, A and B exist at the same time, or B exists alone. In addition, the character "/" herein generally represents that the former and latter associated objects are in an "or" relationship.

Figure 2:
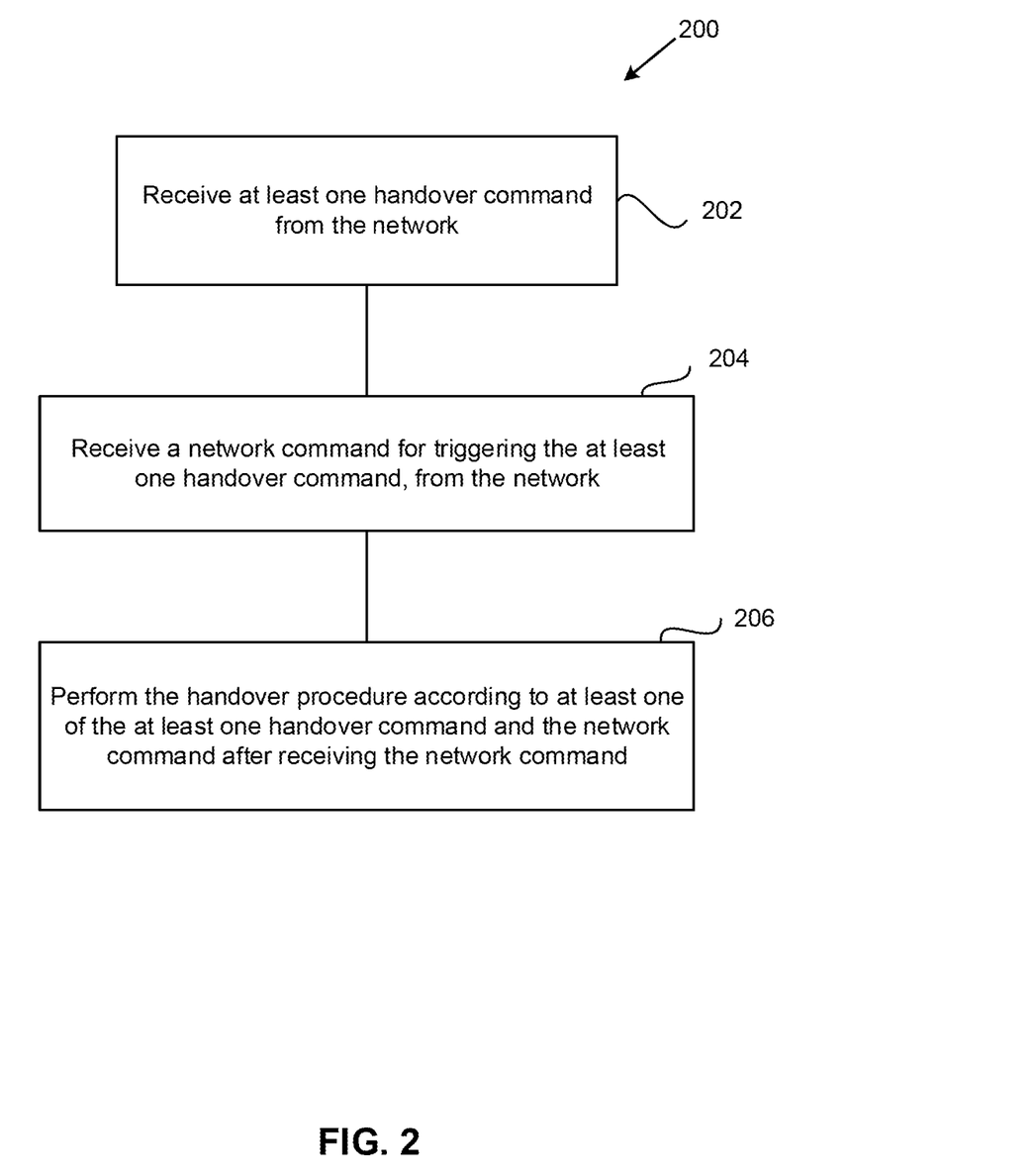
FIG. 2 is a flowchart illustrating a handover procedure in a non-terrestrial network, in accordance with example implementations of the present disclosure.

FIG. 2 is a flowchart illustrating a handover procedure in a non-terrestrial network, in accordance with example implementations of the present disclosure. FIG. 2 illustrates the method 200 for a UE to perform the handover procedure. In action 202, the UE receives at least one handover command from the network. In action 204, the UE receives a network command for triggering the at least one handover command, from the network. In action 206, the UE performs the handover procedure according to at least one of the at least one handover command and the network command after receiving the network command.

Based on the method 200, the UE performs the handover (HO) procedure according to the received HO command after the network command for triggering the HO command is received.

In the present disclosure, a new kind of HO command for a group of UEs is introduced. In one implementation, the UE may implicitly belong to a group (e.g., with a group identity (ID)) based on its UE ID (e.g., 5G S-Temporary Mobile Subscription Identifier (5G-S-TMSI), Inactive Radio Network Temporary Identifier (I-RNTI), but not limited thereto) or based on its location information (e.g., the group area information provided by a network). For example, if 'K' group is configured or K group-based HO commands are broadcast, the group ID of the UE may be the UE ID mod K, but not limited thereto. In another example, if the UE is located in the area A1 configured as group K1, the group ID of the UE may be assigned as K1. In other examples, the UE may be explicitly assigned to a group (e.g., with a group ID) according to the network command. In some implementations, the UE with a group ID ID #1 may perform the handover command with the group ID ID #1 (e.g., when receiving the network command to trigger the HO procedure).

The HO command (or may also be called the group-based HO command) may be a radio resource control (RRC) reconfiguration message with parameters for the synchronous reconfiguration to the target primary cell (SpCell). The parameters for the synchronous reconfiguration to the target SpCell may be included in the reconfigurationWithSync field within ReconfigurationWithSync of a cell group configuration (e.g., CellGroupConfig IE), but are not limited thereto. The SpCell is a Special Cell, and the term special cell in the dual connectivity operation refers to the Primary Cell (PCell) of the Master Cell group (MCG) or the Primary Secondary Cell (PSCell) of the Secondary Cell group (SCG). The CellGroupConfig IE is used for configuring the MCG or the SCG. A cell group comprises one medium access control (MAC) entity, a set of logical channels associated with radio link control (RLC) entities, a primary cell (SpCell), and one or more Secondary Cells (SCells).

In some implementations, the HO command (also called the group-based HO command) may be applied by a group of UEs. In some implementations, each group-based HO command may be assigned a group ID.

In some implementations, the HO command (or the group-based HO command) with the group ID may be applied by UE(s) configured with the same group ID.

In some implementations, the group-based HO command may not include a radio bearer configuration (e.g., RadioBearerConfig IE). The RadioBearerConfig IE is used for adding, modifying, and releasing signaling radio bearers and/or data radio bearers. Specifically, the RadioBearerConfig IE carries the parameters for Packet Data Convergence Protocol (PDCP) and, if applicable, Service Data Adaptation Protocol (SDAP) entities for the radio bearers. It should be noted that the UE may apply the current or previously stored radio bearer configuration (e.g., RadioBearerConfig IE) for the HO procedure when the UE receives the group-based HO command without the radio bearer configuration. In other words, the radio bearer configuration may be mandatorily absent in the group-based HO command in the NTN scenario.

In some implementations, the group-based HO command may not include a dedicated random access channel (RACH) configuration (e.g., RACH-ConfigDedicated IE). The RACH-ConfigDedicated IE is used to specify the dedicated random access parameters. In other words, the dedicated RACH configuration may be mandatorily absent in the group-based HO command in the NTN scenario. Therefore, the dedicated RACH configuration for the HO procedure may be transmitted to the UE via a radio resource control (RRC) message. Thus, the UE may first receive the RRC message with the dedicated RACH configuration to perform the HO procedure and then receive the group-based HO command afterward.

In some implementations, a RACH-less operation may be configured in an HO command (e.g., a group-based HO command or a normal HO command). If the RACH-less operation is configured in the HO command, the UE accesses a target cell for an HO procedure via the UL grant pre-allocated to the UE in an RRC_message, in a downlink control information (DCI), or in a MAC control element (CE). If the UE does not receive the pre-allocated UL grant, the UE monitors a physical downlink control channel (PDCCH) of the target cell. If the RACH-less operation is configured in the HO command, a container in "HANDOVER REQUEST ACKNOWLEDGE" message may include adjustment indication and optionally a pre-allocated UL grant. If the access towards the target cell (using RACH operation or RACH-less operation) for HO procedure is not successful within a certain time, the UE initiates radio link failure recovery (e.g., MCG radio link failure recovery) using a suitable cell. In some implementations, if RACH-less operation is configured in the HO command, but is not successful within a configured time, the UE may fallback to access the target cell via a random access (RA) procedure.

In some implementations, the group-based HO command may include a timer (e.g., timer T304, as defined in the 3GPP). In some implementations, the timer T304 is only allowed to be absent in the group-based HO command. For example, the timer T304 may not be included in the group-based HO command but be broadcasted in system information. For example, the value of the timer T304 may be included in UE-TimersAndConstants IE of system information block 1 (SIB1), but is not limited to. The UE-TimersAndConstants IE contains timers and constants used by the UE in the RRC_CONNECTED, RRC_INACTIVE, and RRC_IDLE mode. A default value of the timer T304 may be pre-configured/pre-defined and may be applied by the UE. If the timer T304 of the group-based HO command is not included, the UE may apply the default value of the timer T304 for the HO procedure.

In one example, the timer T304 may be started upon reception of an RRCReconfiguration message including reconfigurationWithSync, and may be stopped upon successful completion of a random access on the corresponding SpCell. The UE may initiate the RRC re-establishment procedure when the timer T304 of an MCG expires. It should be noted that the timer T304 is mandatorily present or included in a normal HO command (namely for a single UE). In addition, the timer T304 of the normal HO command or the group-based HO command may only be allowed to be absent in the NTN scenario. In another implementation, the timer T304 of the group-based HO command may be allowed to be absent.

In some implementations, the group-based HO command may include parameters/configurations of a target BS for the HO procedure, where the parameters/configurations may be common to the UEs in the same group.

The UE may apply the value of the new UE identity as the Cell-Radio Network Temporary Identifier (C-RNTI) for the associated cell group when receiving the reconfigurationWithSync of the RRCReconfiguration message. In one implementation, the group-based HO command may not include the new UE identity (e.g., newUE-Identity IE). Therefore, the UE may reuse the previously stored C-RNTI if the new UE identity is not included in the group-based HO command or the normal HO command.

In some implementations, the group-based HO command or the normal HO may include an offset time (or delay information) for indicating the UE not to immediately execute the received HO command, but execute the received HO command after the offset time. For example, if the offset time is configured with the value t1, when the UE receives the HO command (either the group-based HO command or the normal HO) at time T5, the UE may start performing the HO procedure at time T5+t1. In other examples, upon receiving the offset time, the UE may start a timer (e.g., beginning at 0). If the timer does not count to the offset time (e.g., t1), the UE may not execute the received HO command. On the contrary, if the timer counts to the offset time (e.g., t1), the UE may execute the received HO command and stop the timer.

In some implementations, if an RA procedure is not completed during the HO procedure, the UE may randomly select a backoff time according to a uniform distribution between 0 and the parameter PREAMBLE_BACKOFF, and perform the random access resource selection of the RA procedure after the backoff time. In one example, a backoff indicator for a first RA attempt (i.e., random access resource selection for preamble transmission) of the RA procedure may be configured and included in the group-based HO command, the normal HO command or via the system information. When the RA procedure is initiated, the UE (or its MAC entity) may set the PREAMBLE_BACKOFF to the value indicated by the configured backoff indicator. When the RA procedure is initiated, the UE (or its MAC entity) may set the PREAMBLE_BACKOFF to the value indicated by the configured backoff indicator multiplied with a scaling factor (e.g., SCALING_FACTOR_BI). In addition, (e.g., after the first RA attempt), if no explicit backoff indicator is assigned in the random access response (RAR) message or no explicit backoff indicator is received in the RAR message within a RAR window), the UE may set the PREAMBLE_BACKOFF to the value indicated by the configured backoff indicator with or without the scaling factor for the next RA attempt of the RA procedure.

Moreover, if a downlink assignment has been received on the PDCCH for the Random Access Radio Network Temporary Identifier (RA-RNTI), a received transport block (TB) is successfully decoded, and the condition of "the RAR received by the UE includes a MAC subPDU with an assigned backoff indicator" is not fulfilled, specifically the MAC subPDU with the assigned backoff indicator is not included in the RAR, the UE (or its MAC entity) may set the PREAMBLE_BACKOFF to the value indicated by the configured backoff indicator. In some implementations, if the downlink assignment has been received on the PDCCH for the RA-RNTI, the received TB is successfully decoded and the condition of "the RAR received by the UE includes a MAC subPDU with the assigned backoff indicator" is not fulfilled, specifically the MAC subPDU with the assigned backoff indicator is not included in the RAR, the UE (or its MAC entity) may set the PREAMBLE_BACKOFF to the value indicated by the configured backoff indicator multiplied with a scaling factor (e.g., SCALING_FACTOR_BI).

In some implementations, the configured backoff indicator for all RA attempts of the RA procedure for the corresponding HO procedure may be included in the group-based HO command or the normal HO command. If the configured backoff indicator is included in the group-based HO command or the normal HO command, the UE may ignore the assigned backoff indicator in the MAC subPDU of the received RAR. In other implementations, if the UE does not receive the configured backoff indicator in the group-based HO command or the normal HO command, the UE may use a default backoff indicator that is pre-configured/pre-specified for the UE, to perform the random access resource selection of the RA procedure.

The UE with a higher priority may ignore the configured backoff indicator for the first RA attempt of the RA procedure included in the group-based HO command or the normal HO command. Similarly, the UE with a higher priority may ignore the configured backoff indicator for all RA attempts of the RA procedure included in the group-based HO command or the normal HO command. In one example, the priority of the UE may be pre-configured, based on the on-going services, or based on the information included in a received downlink control information (DCI) or Medium Access Control (MAC) control element (CE), which may be used for triggering the HO command. In another example, the priority of the UE may be determined/defined based on access class (or access category) defined/negotiated via a Non-Access-Stratum (NAS) message. In other examples, the priority of the UE may be determined/defined based on UE mobility status. For example, the UE in high mobility state may ignore the configured backoff indicator for all RA attempts of the RA procedure for the corresponding HO procedure.

In some implementations, the group-based HO command may be executed with conditions (e.g., a conditional HO command or a conditional reconfiguration). A group-based HO command may be executed when the associated triggering/execution condition(s) is fulfilled. The triggering/execution conditions(s) may be associated with one or more measurement identity. For example, the UE may execute the conditional HO command at an exact time point. In another example, the UE may execute the conditional HO command when the UE locations within a configured area. In other examples, the UE may store one or more conditional HO commands, and execute the condition HO command(s) when a DCI or MAC CE for triggering the HO command is received.

The UE may be configured with an NTN-RNTI and the UE may receive a DCI with a Cyclic Redundancy Check (CRC) scrambled by the NTN-RNTI to receive the HO command. In some implementations, the NTN-RNTI may be associated with a group ID, and the UE may receive the DCI with the CRC scrambled by the NTN-RNTI that is associated with the UE's group ID. In one example, the pair(s) of the NTN-RNTI and the group ID may be broadcasted in system information. In other examples, the pair(s) of the NTN-RNTI and a group ID may be transmitted to the UE via dedicated signaling.

It should be noted that the UE may store the received HO command without performing the HO procedure when receiving the HO command. The UE performs the HO procedure after receiving the network command (e.g., DCI or MAC CE). Various cases for the network command are disclosed.

Case 1: Network Command for Triggering the Received HO Command

A serving cell (e.g., source BS) may broadcast a single HO command (e.g., the group-based HO command or normal HO command). In addition, the UE may receive the network command (e.g., a DCI with a CRC scrambled by the UE's C-RNTI or a MAC CE) for indicating the UE to perform the HO procedure, from the serving cell.

Figure 3:
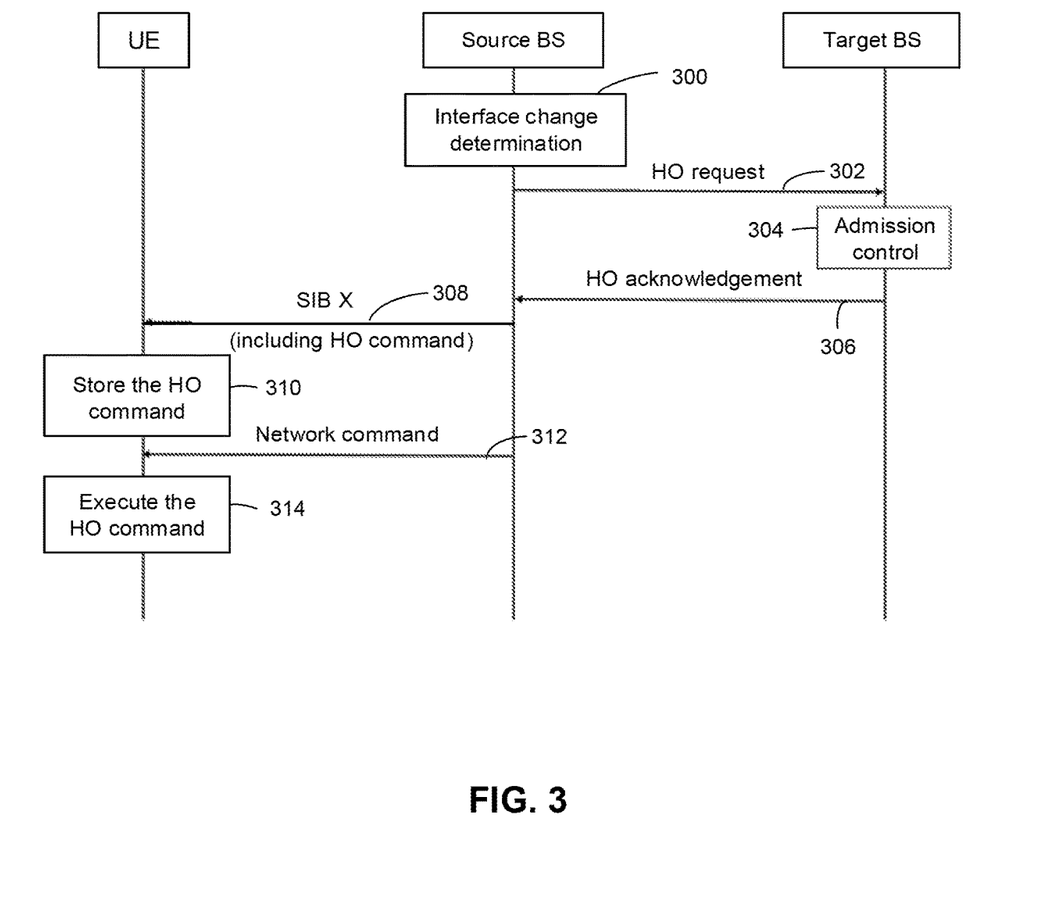
FIG. 3 is a schematic diagram illustrating a handover procedure with network command triggering, in accordance with example implementations of the present disclosure.

FIG. 3 is a schematic diagram illustrating a handover procedure with network command triggering, in accordance with example implementations of the present disclosure. With reference to FIG. 3, (for example, in case of gNB-CU change in NTN), the, source BS may determine that an interface change may happen (e.g., action 300) and perform an HO preparation procedure to the target stations for all of the connected UEs (e.g., action 302). The target BS may perform admission control for an HO procedure (e.g., action 304). After receiving an HO acknowledgment message from the target BS (e.g., action 306) in response to the HO request message (e.g., action 302), the source BS may broadcast a SIB X that includes an HO command (e.g., the group-based HO command for all the connected UEs (e.g., action 308). A UE connected to the source BS may acquire the SIB X and then store the broadcast HO command (e.g., action 310). To avoid the collision of HO procedures (e.g., multiple UEs that receive the group-based HO command may perform the HO procedures to handover to the target BS at the same time), the source BS may transmit the network command (e.g., a DCI or MAC CE) for each connected UE at different times (e.g., action 312). Upon receiving the network command, the UE may execute the stored HO command accordingly (e.g., action 314). In some implementations, the source BS may broadcast the SIB X periodically. In some implementations, the source BS may broadcast the SIB X if the UE requests the source B via a dedicated signaling or an RA preamble.

Case 2: Network Command for Triggering the Indicated HO Command

A serving cell (e.g., source BS) may broadcast multiple HO commands (e.g., multiple group-based HO commands or normal HO commands). The UE may receive the network command (e.g., a DCI with a CRC scrambled by the UE's C-RNTI or a MAC CE) from the serving cell, where the network command indicates the UE to execute the indicated broadcast HO command. For example, the network command may contain the information of a group ID for indicating a specific HO command of the multiple HO commands.

Case 3: Network Command for Triggering the Selected HO Command

A serving cell (e.g., source BS) may broadcast multiple HO commands (e.g., multiple group-based HO commands or normal HO commands). The UE may receive the network command (e.g., a DCI with a CRC scrambled by the UE's C-RNTI or MAC CE) from the serving cell, where the network command indicates the UE to execute one of the broadcasting HO commands selected by the UE. HO command selection may be pre-defined (e.g., random selection), based on UE implementation, based on the group ID configured by network configuration, or based on UE IDs (e.g., 5G System Architecture Evolution (SAE) Temporary Mobile Subscriber Identity (TMSI)).

The HO command disclosed in cases 1-3 may be broadcasted via system information or may be included in a paging message. In some implementations, the UE connected to the serving cell may acquire the HO command(s) if a SIB containing the broadcasting HO command(s) is received. In some implementations, the UE (e.g., in the inactive or the IDLE mode) camped on the serving cell may acquire the broadcast HO command(s) if a SIB containing the broadcasting HO command(s) is received.

It should be noted that the UE disclosed in cases 1-3 may receive the network command and then receive the broadcasting HO command(s) afterward.

In some implementations, the HO command may include a prohibit timer. The UE may start the prohibit timer when the UE receives the HO command. While the prohibit timer is running, the UE may not perform the HO procedure except receiving the network command to trigger the HO command. Otherwise, the UE may be allowed to perform the HO procedure when the prohibit timer expires.

In some implementations, different HO commands (e.g., the group-based HO commands) may be broadcasted in different SIBs. In some implementations, the UE may require acquiring all SIBs including the group-based HO commands. In some implementations, the UE associated with a group ID may only require acquiring SIB including the group-based HO command of the same group ID, and store the group-based HO command.

Alternatively, the UE may independently perform the HO procedure. The UE may decide to perform HO procedure without network involvement. In some implementations, the UE may be allowed to perform the HO procedure to the target BS based on the previously stored configurations (e.g., RadioBearerConfig IE, timer T304, C-RNTI, or spCellConfigCommon 1E) while no HO command or network command is received from the source BS. For example, the UE may determine that it shall handover to the target BS based on its location and/or satellite ephemeris. Thus, the UE may perform the HO procedure to the target BS from the source BS based on the stored configurations.

The network command disclosed in cases 1-3 may be transmitted via a DCI or MAC CE. The DCI design for triggering the HO command (e.g., received/selected/indicated HO command) is disclosed.

In some implementations, the trigger DCI may be a DCI with a CRC scrambled by the UE's C-RNTI. In some implementations, the trigger DCI may be a DCI with a CRC scrambled by a new RNTI. The new RNTI may be assigned via a dedicated signaling, one other DCI, a MAC CE, or broadcasting in system information. The new RNTI may be unique for each UE.

In some implementations, the new RNTI may be unique for each UE group. In some implementations, different HO commands may be triggered by a DCI with a CRC scrambled by different RNTIs. In some implementations, the group ID may be included in the trigger DCI to indicate which HO command to trigger. In some implementations, the trigger DCI may be a DCI with a CRC scrambled by a configured NTN-RNTI. The NTN-RNTI may be unique for each UE. In some implementation, the NTN-RNTI may be unique for each UE group. In some implementations, the trigger DCI may be a DCI with a CRC scrambled by a Paging RNTI (P-RNTI). For example, a short message (which is transmitted on a PDCCH using the P-RNTI) may indicate a bit to trigger the HO command.

In some implementations, the trigger DCI may include an offset time (or delay information) to indicate the UE not to immediately perform the received/selected/indicated HO command, but execute the received/selected/indicated HO command after the offset time. For example, upon receiving the trigger DCI, the UE may start a timer. If the timer does not count to the offset time, the UE may not execute the received/selected/indicated HO command for the HO procedure. If the timer counts to the offset time, the UE may execute the received/selected/indicated HO command for the HO procedure and stop the timer.

In some implementations, the trigger DCI may include the configured backoff indicator for a first RA attempt of the RA procedure. In some implementations, if no assigned backoff indicator is received in the RAR message (e.g., within the RAR window), the UE may set the PREAMBLE_BACKOFF to the value indicated by the configured backoff indicator with or without the scaling factor for the next RA attempt. In some implementations, if a downlink assignment has been received on the PDCCH for the RA-RNTI and the received TB is successfully decoded and if the condition of "the RAR received by the UE includes a MAC subPDU with the assigned backoff indicator" is not fulfilled, the UE (or its MAC entity) may set the PREAMBLE_BACKOFF to the value indicated by the configured backoff indicator included in the trigger DCI. In some implementations, if the downlink assignment has been received on the PDCCH for the RA-RNTI and the received TB is successfully decoded and if the condition of "the RAR received by the UE includes a MAC subPDU with the assigned backoff indicator" is not fulfilled, the UE (or its MAC entity) may set the PREAMBLE_BACKOFF to the value indicated by the configured backoff indicator included in the trigger DCI multiplied with the scaling factor (e.g., SCALING_FACTOR_BI).

In some implementations, the trigger DCI may include the configured backoff indicator for all RA attempts of the RA procedure. In some implementations, if the configured backoff indicator is included in the trigger DCI, the UE may ignore the backoff indicator assigned in a MAC subPDU of the received RAR.

In some implementations, the trigger DCI may include a group ID to indicate the UE which group-based HO command to trigger.

In some implementations, the trigger DCI may include the information field to indicate the prioritization of performing an RA procedure. For example, for the UE that receives the trigger DCI indicating a higher priority, the UE may ignore the configured backoff indicator included in the abovementioned HO command. In another example, for the UE that receives the trigger DCI indicating a higher priority, the UE may apply a smaller value of SCALING_FACTOR_BI. In other examples, for the UE that receives the trigger DCI indicating a lower priority, the UE may apply a larger value of SCALING_FACTOR_BI.

In some implementations, the trigger DCI may include the information about frequency resource assignment and time domain resource assignment.

The MAC CE design for triggering the HO command (e.g., received/selected/indicated HO command) is disclosed.

In some implementations, the trigger MAC CE may be associated with a specific Logical Channel ID (LCD) in the MAC subheader. In some implementations, two or more HO commands (e.g., group-based HO commands) may be triggered by the MAC CE associated with different LCIDs in the MAC subheader. For example, HO command #1 may be triggered by a MAC CE associated with LCID #1 and HO command #2 may be triggered by a MCE CE associated with LCID #2. In some implementations, a group ID may be included in the trigger MAC CE to indicate the UE which group-based HO command to trigger.

In some implementations, the trigger MAC CE may include an offset time (or delay information) to indicate the UE not to immediately execute the received/selected/indicated HO command, but perform the HO procedure after the offset time. For example, upon receiving the trigger MAC CE, the UE may start a timer. If the timer does not count to the offset time, the UE may not execute the received/selected/indicated HO command for the corresponding HO procedure. If the timer counts to the offset time, the UE may execute the received/selected/indicated HO command for the corresponding HO procedure and stop the timer.

In some implementations, the trigger MAC CE may include the configured backoff indicator for the first RA attempt. In some implementations, if no explicit backoff indicator is assigned in the RAR or received within a RAR window, the UE may set the PREAMBLE_BACKOFF to the value indicated by the configured backoff indicator with or without the scaling factor for the next RA attempt. In some implementations, if a downlink assignment has been received by the UE on the PDCCH for the RA-RNTI and the received TB is successfully decoded by the UE and if the condition of "the RAR received by the UE includes a MAC subPDU with the assigned backoff indicator" is not fulfilled, the UE (or its MAC entity) may set the PREAMBLE_ BACKOFF to the value indicated by the configured backoff indicator included in the trigger MAC CE. In some implementations, if the downlink assignment has been received by the UE on the PDCCH for the RA-RNTI and the received TB is successfully decoded by the UE and if the condition of "the RAR received by the UE includes a MAC subPDU with the assigned backoff indicator" is not fulfilled, the UE (or its MAC entity) may set the PREAMBLE_BACKOFF to the value indicated by the configured backoff indicator included in the trigger MAC CE multiplied with the scaling factor (e.g., SCALING_FACTOR_BI).

In some implementations, the trigger MAC CE may include the configured backoff indicator for all RA attempts. In some implementations, if the configured backoff indicator is included in the trigger MAC CE, the UE may ignore the assigned backoff indicator in the MAC subPDU of the received RAR.

In some implementations, the trigger MAC CE may include a group ID to indicate the UE which group-based HO command to trigger.

In some implementations, the trigger MAC CE may include the information field to indicate the prioritization of performing an RA procedure for an HO procedure. For example, for the UE that receives the trigger MAC CE indicating a higher priority, the UE may ignore the configured backoff indicator included in the group-based HO command or normal HO command. In another example, for the UE that receives the trigger MAC CE indicating a higher priority, the UE may apply a smaller value of SCALING_ FACTOR_BI. In other examples, for the UE that receives the trigger MAC CE indicating a lower priority, the UE may apply a larger value of SCALING_FACTOR_BI.

In some implementations, the trigger MAC CE may include a new UE identity (i.e., the new C-RNTI used in the target BS). In some implementations, if the new UE identity is not included in the trigger MAC CE, the UE may reuse the old UE identity (i.e., the C-RNTI used in the source BS) as the UE identity in the new target BS.

In some implementations, the trigger MAC CE may include the UL grant field (e.g., RAR grant field of Table 1) to indicate the resources (e.g., for the RACH-less HO procedure). The size of the UL grant field may be 27 bits and may refer to Random Access Response Grant Content field size in 3GPP standard document TS 38.213, as shown in Table 1, but not limited to.

| RAR grant field | Number of bits |
| --- | --- |
| Frequency hopping flag | 1 |
| Msg3 Physical Uplink Shared Channel (PUSCH) frequency resource allocation | 14 |
| Msg3 PUSCH time resource allocation | 4 |
| MCS | 4 |
| TPC command for Msg3 PUSCH | 3 |
| CSI request | 1 |

For power saving aspects, when the UE starts executing an HO command (or start performing a corresponding HO procedure) to a target BS (via a dedicated signaling or broadcasting system information) with an offset time (or delay information), the UE may suspend the measurements and/or measurement reporting based on the stored measurement configurations.

In some implementations, if the UE stays in the same area or a configured area, and/or under the coverage of NTN (e.g., assistance information provided by a BS via a dedicated signaling or system information), the UE may suspend measurements and/or measurement reporting automatically even if a measurement configuration is received. For example, the UE may be configured to report its location information, and the BS may consider the UE is stationary based on the received location information. In some implementations, the UE may report its status/device type as stationary or not to the BS for reference. If the BS knows that the UE is stationary, the BS may not transmit measurement configuration to the UE and may notify the UE to perform a blind HO procedure (i.e., an HO procedure without measurement). If the BS knows that the UE is not stationary, the BS may transmit measurement configuration to the UE.

Figure 4:
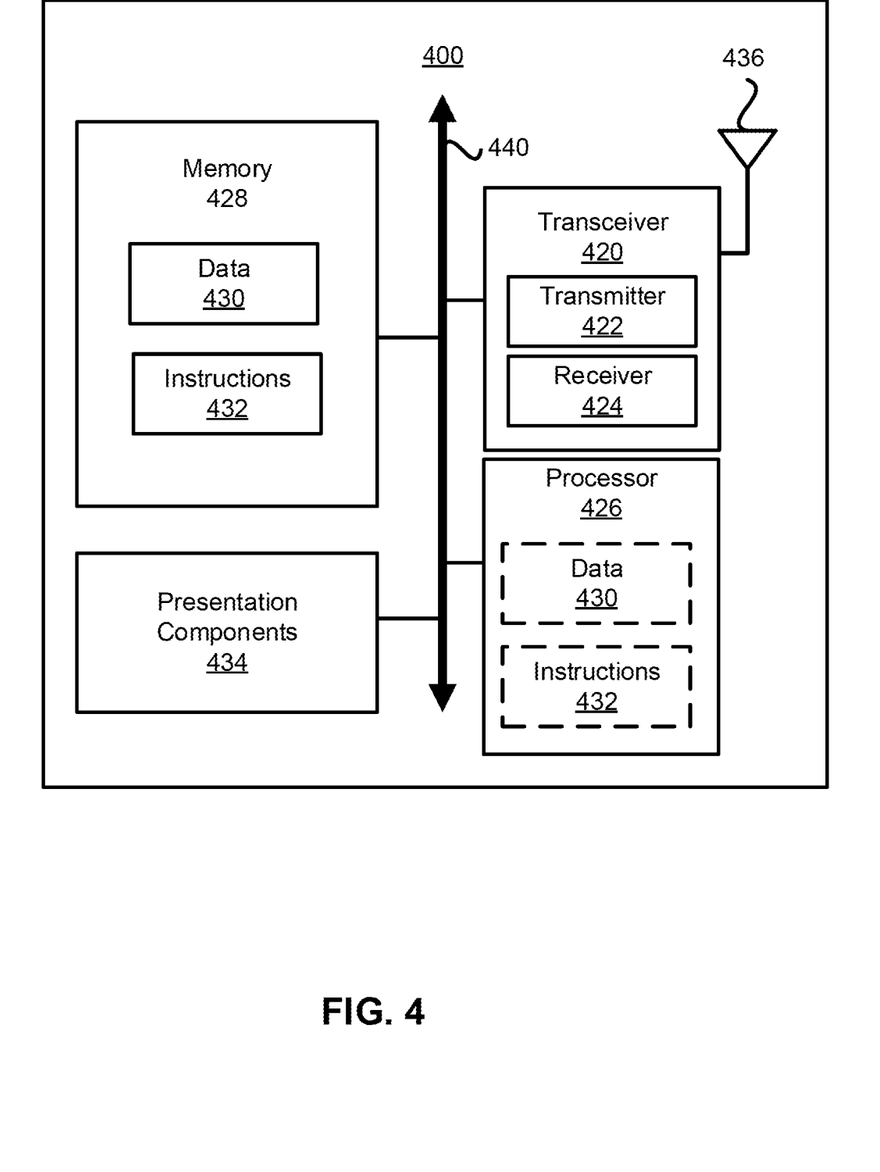
FIG. 4 is a block diagram illustrating a node for wireless communication, in accordance with example implementations of the present disclosure.

FIG. 4 is a block diagram illustrating a node 400 for wireless communication, in accordance with example implementations of the present disclosure.

As illustrated in FIG. 4, the node 400 may include a transceiver 420, a processor 426, memory 428, one or more presentation components 434, and at least one antenna 436. The node 400 may also include a Radio Frequency (RF) spectrum band module, a BS communications module, a network communications module, and a system communications management module, input/output (I/O) ports, I/O components, and a power supply (not shown). Each of these components may be in communication with each other, directly or indirectly, over one or more buses 440. The node 400 may be a UE that performs various disclosed functions as illustrated in FIG. 2.

The transceiver 420 includes a transmitter 422 (with transmitting circuitry) and a receiver 424 (with receiving circuitry) and may be configured to transmit and/or receive time and/or frequency resource partitioning information. The transceiver 420 may be configured to transmit in different types of subframes and slots including but is not limited to, usable, non-usable, and flexibly usable subframes and slot formats. The transceiver 420 may be configured to receive data and control channels.

The node 400 may include a variety of computer-readable media. Computer-readable media may be any media that can be accessed by the node 400 and include both volatile and non-volatile media, removable and non-removable media. Computer-readable media may include computer storage media and communication media. Computer storage media includes both volatile and non-volatile, as well as removable and non-removable media implemented in any method or technology for storage of information such as computer-readable instructions, data structures, program modules, or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not include a propagated data signal. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. Communication media includes wired media such as a wired network or direct-wired connection, and wireless media such as acoustic, RF, infrared and other wireless media. Combinations of any of the disclosed media should be included within the scope of computer-readable media.

The memory 428 may include computer-storage media in the form of volatile and/or non-volatile memory. The memory 428 may be removable, non-removable, or a combination thereof. Memory includes solid-state memory, hard drives, and optical-disc drives. As illustrated in FIG. 4, the memory 428 may store computer-readable, computer-executable instructions 432 (e.g., software codes) that are configured to cause the processor 426 (e.g., processing circuitry) to perform various disclosed functions. Alternatively, the instructions 432 may be configured to cause the node 400 (e.g., when compiled and executed) to perform various disclosed functions.

The processor 426 may include an intelligent hardware device (e.g., a central processing unit (CPU), a microcontroller, an ASIC, etc.). The processor 426 may include memory. The processor 426 may process the data 430 and the instructions 432 received from the memory 428, and information received via the transceiver 420, the baseband communications module, and/or the network communications module. The processor 426 may also process information to be sent to the transceiver 420 for transmission via the antenna 436, to the network communications module for transmission to a CN.

One or more presentation components 434 present data to a person or other device. Presentation components 434 include a display device, speaker, printing component, and vibrating component.

From the previous disclosure, it is evident that various techniques can be utilized for implementing the concepts of the present disclosure without departing from the scope of those concepts. Moreover, while the concepts have been described with specific reference to certain implementations, a person of ordinary skill in the art would recognize that changes can be made in form and detail without departing from the scope of those concepts. As such, the disclosure is to be considered in all respects as illustrative and not restrictive. It should also be understood that the present disclosure is not limited to the particular described implementations, but that many rearrangements, modifications, and substitutions are possible without departing from the scope of the present disclosure.

What is claimed is:

1. A method for a user equipment (UE) for performing a handover procedure, the method comprising:
   receiving, from a network, a handover command;
   after determining that first information related to an offset time is included in the handover command, suspending a measurement and a corresponding measurement reporting during the offset time and performing the handover procedure based on the handover command after the offset time;
   after determining that second information related to a configured area is included in the handover command, performing the handover procedure based on the handover command when the UE is located within the configured area;
   selecting a backoff time from a backoff time range indicated by a backoff indicator included in the handover command; and
   performing a random access resource selection procedure for the handover procedure based on the backoff time.

2. The method of claim 1, further comprising:
   receiving, from the network, a network command for triggering the handover command; and
   after receiving the network command, performing the handover procedure according to at least one of the handover command and the network command.

3. The method of claim 2, wherein the offset time is included in the at least one of the handover command and the network command for instructing the UE to perform the handover procedure after the offset time.

4. The method of claim 2, wherein the network command includes priority information for performing a random access procedure by the UE during the handover procedure.

5. The method of claim 1, wherein the handover command is assigned a first identity.

6. The method of claim 5, further comprising:
   receiving, from the network, a second handover command that is assigned a second identity different from the first identity;
   receiving, from the network, a configuration indicating a third identity;
   performing the handover procedure based on the handover command after determining that the first identity matches the third identity; and
   performing the handover procedure based on the second handover command after determining that the second identity matches the third identity.

7. The method of claim 5, wherein:
the network command includes an indication associated with the first identity for instructing the UE to apply the handover command for the handover procedure.

8. The method of claim 1, wherein:
the random access resource selection procedure is performed according to a priority of the UE, and
the priority is determined by the UE according to at least one of a service, an access class, and a mobility status of the UE.

9. A user equipment (UE) for performing a handover procedure, the UE comprising:
at least one processor; and
at least one non-transitory computer-readable medium coupled to the at least one processor and storing one or more instructions that, when executed by the at least one processor, cause the UE to:
receive, from a network, a handover command;
after determining that first information related to an offset time is included in the handover command, suspend a measurement and a corresponding measurement reporting during the offset time and perform the handover procedure based on the handover command after the offset time;
after determining that second information related to a configured area is included in the handover command, perform the handover procedure based on the handover command when the UE is located within the configured area;
select a backoff time from a backoff time range indicated by a backoff indicator included in the handover command; and
perform a random access resource selection procedure for the handover procedure based on the backoff time.

10. The UE of claim 9, wherein the one or more instructions, when executed by the at least one processor, further cause the UE to:
receive, from the network, a network command for triggering the handover command; and
after receiving the network command, perform the handover procedure according to at least one of the handover command and the network command.

11. The UE of claim 10, wherein the offset time is included in the at least one of the handover command and the network command for instructing the UE to perform the handover procedure after the offset time.

12. The UE of claim 10, wherein the network command includes priority information for performing a random access procedure by the UE during the handover procedure.

13. The UE of claim 9, wherein the handover command is assigned a first identity.

14. The UE of claim 13, wherein the one or more instructions, when executed by the at least one processor, further cause the UE to:
receive, from the network, a second handover command that is assigned a second identity different from the first identity;
receive, from the network, a configuration indicating a third identity;
perform the handover procedure based on the handover command after determining that the first identity matches the third identity; and
perform the handover procedure based on the second handover command after determining that the second identity matches the third identity.

15. The UE of claim 13, wherein:
the network command includes an indication associated with the first identity for instructing the UE to apply the handover command for the handover procedure.

16. The UE of claim 9, wherein:
the random access resource selection procedure is performed according to a priority of the UE, and
the priority is determined by the UE according to at least one of a service, an access class, and a mobility status of the UE.

* * * * *